United States Patent

Eggen et al.

[11] Patent Number: 5,995,094
[45] Date of Patent: Nov. 30, 1999

[54] USER-ORIENTED MULTIMEDIA PRESENTATION SYSTEM FOR MULTIPLE PRESENTATION ITEMS THAT EACH BEHAVE AS AN AGENT

[75] Inventors: Josephus H. Eggen; Stefen C. Pauws, both of Eindhoven, Netherlands

[73] Assignee: U.S. Philips Corporation, New York, N.Y.

[21] Appl. No.: 08/810,792

[22] Filed: Mar. 4, 1997

[30] Foreign Application Priority Data

Mar. 4, 1996 [EP] European Pat. Off. .............. 96200574

[51] Int. Cl.⁶ ........................................................ G06F 3/00
[52] U.S. Cl. ........................... 345/328; 345/333; 345/334; 345/349; 345/302
[58] Field of Search ..................................... 345/327, 328, 345/333, 338, 345, 302, 334, 336, 349, 970

[56] References Cited

U.S. PATENT DOCUMENTS

| | | | |
|---|---|---|---|
| 5,148,154 | 9/1992 | Mackay et al. | 345/340 |
| 5,418,887 | 5/1995 | Connah et al. | 395/51 |
| 5,524,195 | 6/1996 | Clanton, III et al. | 345/327 |
| 5,680,619 | 10/1997 | Gudmundson et al. | 395/701 |
| 5,684,715 | 11/1997 | Palmer | 348/473 |
| 5,740,085 | 4/1998 | Wavish | 364/578 |
| 5,751,281 | 5/1998 | Hoddie et al. | 345/302 |
| 5,768,161 | 6/1998 | Wavish | 364/578 |
| 5,794,249 | 8/1998 | Orsolini et al. | 707/104 |
| 5,861,881 | 1/1999 | Freeman et al. | 345/302 |

OTHER PUBLICATIONS

08/498,280 (PHB 33,915A)
08/655,169 (PHN 15,336)

*Primary Examiner*—Raymond J. Bayerl
*Assistant Examiner*—Cuong T. Thai

[57] ABSTRACT

A user-adaptive audio and/or video presentation system contains a background sub-system for presenting audio and/or video items, control for the background subsystem as regarding an actual selection sequence amongst the items according to a user preference pattern, and output means for physically presenting selected items to a user. Each item has a uniformly structured first set of static attribute data and associated second set of weight value data, and a third set of dynamic behaviour data. The dynamic behaviour of the items is collectively governed by behavioral and interactivity prescriptions, so that each respective item represents an autonomous agent. The control includes processing for under influence of the first and second sets of data and as governed by the prescriptions, updating weight and dynamic behaviour parameter data of each item versus other items for subsequently influencing the controlling.

14 Claims, 6 Drawing Sheets

USER-ORIENTED MULTIMEDIA PRESENTATION SYSTEM FOR MULTIPLE PRESENTATION ITEMS THAT EACH BEHAVE AS AN AGENT

BACKGROUND OF THE INVENTION

The invention relates to a user-adaptive audio and/or video presentation system containing a background presentation sub-system for presenting audio and/or video items, control means for controlling said presentation sub-system as regarding an automatically generated selection sequence amongst said items according to a user preference pattern, and output means for physically presenting selected items to a user. Present-day delivery systems are quickly growing in terms of storage capacity and presentation bandwidth. Vis à vis a more or less constant absorption capacity for information flow in humans, this confronts the user person with an increasingly complex decision problem for choosing between various alternative presentations. A non-limiting example of such system is a jukebox loaded with Compact Discs, that could at present contain a hundred discs with some twenty songs each. The user could then choose along various strategies, such as random amongst the discs and sequential per disc, but this has been found too restrictive. On the other hand, random selection among all tracks present is felt as insufficiently coherent.

The selection problem sketched above can occur in various other environments, such as when choosing between a hundred or more concurrent TV channels, that each feature a sequence of items, or in a large collection of CD Video discs. Similar situations can occur with video clips or video games. The items may be based on uniform technology such as in the case of CD records. In a multimedia situation, the items may be intermixed, such as audio records competing against TV channels, or in the case of simultaneously selecting among still pictures as well as among audio items for concurrent presentation of the chosen audio plus video. Competing items need not have uniform presentations, such as an audio record versus an interactive audio-plus-video-plus-graphics game. The problem may occur on several hierarchical levels at a time, such as when simultaneously selecting among audio tracks as well as among whole audio records.

The present inventors have encountered a need for machine implementing a sequential choice amongst the items that is both meaningful in view of the user's preferences, but on the other hand is sufficiently non-uniform between different presentation sessions, and thereby gives both some coherence between presentations that are relatively close in time, but also certain startling effects through differentiating between such presentations and introducing a certain variability between different sessions.

SUMMARY TO THE INVENTION

Therefore, amongst other things it is an object of the invention to provide a system as recited above that gives more coherent presentation sequences than random selection alone would produce, but on the other hand observes more variability than what has been marketed up to now as 'favourite track selection': therein, after programming of a particular sequence, this sequence remains fixed. A particular additional problem of 'favourite track selection' is the need for individual programming by each user, which many users have felt as cumbersome. On the other hand, in 'shuffle play' the player itself executes a random selection amongst items that are physically available; in the view of the present invention, a system of this kind has too little coherence in a sequence of items presented.

According to a first aspect of the invention it is thereto characterized in that each said item has a uniformly structured first set of static attribute data and associated second set of weight value data, and also a third set of dynamic behaviour parameter data, and said items are with respect to their dynamic behaviour collectively governed by a set of behavioral and interactivity prescriptions, so that each respective item represents a respective autonomous agent, and said control means include processing means for under influence of said first and second sets of data and as governed by said prescriptions, updating said weights and dynamic behaviour parameter data of each item in question vis à vis other said items for subsequently influencing said controlling. The formulating as autonomous agents allows for a wide variability of presentations, while also retaining a certain coherence between successive items. The three levels for defining the properties of the items (attribute, weight and actual behaviour) allow wide applicability of the principles explained hereabove.

By itself, earlier developments by the present assignee have led to other agent-based systems, such as disclosed in U.S. Pat. No. 5,418,887 (PHB33549), EP 704 077, corresponding U.S. patent application Ser. No. 08/418,995 (PHB 33903), EP Application 724 751 corresponding U.S. patent application Ser. No. 08/498,289 (PHB33914), EP Application 722 592, corresponding U.S. patent application Ser. No. 08/498,280 (PHB33915), and EP 95201526.1, corresponding U.S. patent application Ser. No. 08/655,169 (PHN15336).

Now, the present invention implements the items as autonomous agents. Such autonomous agents contain their own static attribute data and dynamic weight data. A weight indicates the relevance of the associated static attribute. The dynamic behaviour parameters represent the actual behaviour of the item. The behavioral and interactivity prescriptions govern the evolving behaviour, under influence of static and dynamic properties of the item, and under influence of interactions between the respective items.

Advantageously, said behaviour is metaphored as motion within a finite space of at least two dimensions. This allows continual evolution of the behaviour of the items, and thereby lends maximum flexibility thereto. Moreover, it allows an excellent visualization of the behaviour, thereby enabling all kinds of potential fine-tuning by a user, through effecting various selections. The behaviour can be visualized on a display screen, either at prototype or high-end machines only, or alternatively, on all machines that have a display screen.

Advantageously, such system is arranged for forming among said items one or more temporary association clusters, which forming is conditional to similar behaviour amongst the respective item agents in such cluster, and said presentation favours an item pertaining to a most recently accessed said cluster. In particular, the notion of a cluster has been found to introduce some structure among the various items, thereby giving a certain amount of coherence in the presentation sequence.

Advantageously, the system has user evaluation input means for selectively influencing said updating at least with respect to said weight value data for a particular item through an evaluatory physical input. In this manner, opinions of an actual user can influence the behaviour of the agents and thus codetermine the outcome of the selection process.

Advantageously, a system having freeze means for blocking autonomy of said agents, and thus freezing said behaviour as dictated by said autonomy. For example, the freezing can become effective at the end of a presentation sequence. The same machine may then cater to various user preference patterns, that could differ between persons, as well as between different situations, such as depending on time-of-day. The freezed situation could be stored for later reactivation. The invention may be used in a network environment, either with broadcast presentation, or with personalized presentation, such as with earphones. Each user could have his own evaluation mechanism for influencing the agent behaviour.

Advantageously, said presentation sub-system is a storage system for storing and accessing audio items which are distributed amongst a plurality of physical media instances that each allow collective storage of a plurality of such items. This is a particularly advantageous embodiment. The invention also relates to a method for audio and/or video presentations along the principles set out above. Various further advantageous aspects are recited in dependent claims.

BRIEF DESCRIPTION OF THE DRAWING.

These and other aspects and advantages of the invention will be explained more in detail with reference to the detailed disclosure of preferred embodiments hereinafter, and in particular with reference to the appended Figures that show.

A FEW USER ASPECTS OF THE PRESENT INVENTION

The invention has for the present embodiment been abbreviated as PATS (Personalized Automatic Track Selection). In the terminology of Compact Disc, usually each track corresponds to exactly one song or other audio equivalency. An earlier system for giving users influence on the presentation sequence in advance of the actual presentation, has been marketed as 'favourite track selection' (FTS). Therein, the user programs the disc player to follow a particular sequence amongst the tracks with respect to a particular Compact Disc or other medium. For players that allow a more or less random selection amongst a plurality of discs, such favourite tracks selection can be implemented both within a particular disc, and also amongst those various discs, in the way of a jukebox. Users have felt the programming a tedious effort. Further, the programming is generally linked to the memory of a particular player. Even if the programming sequence would be stored on a writable part of the disc, it is fixed. However, users may want to apply the present invention in a number of different activities, such as active listening, background music, and personalizing the sequence for use at a particular occasion, such as giving it as a present or playing it at a party.

The present invention serves user intentions that are not optimally addressed by current systems. Examples of such specific intentions that the present system tries to accommodate are:

people may enjoy somebody else doing the selecting of music for them, such as disc jockeys or radio programmes.

people like to listen to music that is known to them.

people like a certain coherence between successive music tracks that form a listening session, such as thematic radio programmes or radio channels focusing on a particular style.

people appreciate assistance in the selection process when the amount of available music to choose from becomes larger, such as in the case of magazines or sampler CD's.

somebody who 'knows' the user can influence the selection process by presenting interesting or unexpected options, such as would be the case for a sales person or an acquaintance.

the selection of certain music tracks is influenced by the ones previously listened to.

DETAILED DISCLOSURE OF PREFERRED EMBODIMENTS

Figure 1:
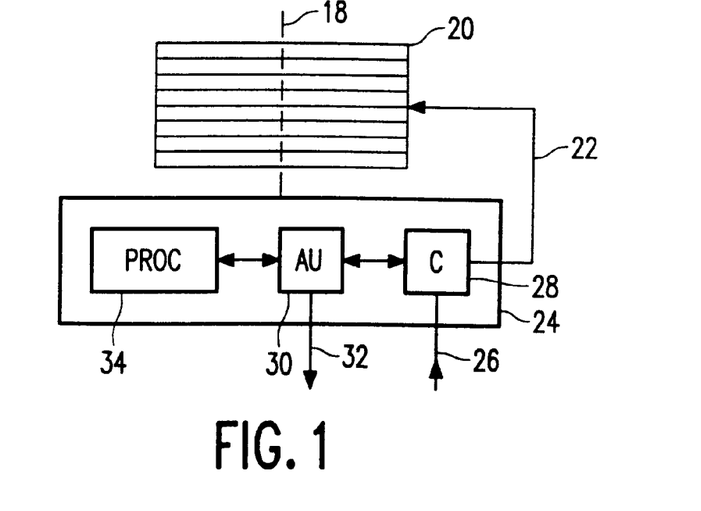
FIG. 1, a block diagram of an exemplary embodiment.

FIG. 1 is a block diagram of an exemplary embodiment of the invention, in particular as realized in the context of a Compact Disc player with jukebox functionality. For reasons of clarity, all parts and subsystems have been shown in fragmentary manner only. Now, a stack 20 of records is rotated by means of a drive mechanism symbolized by axis 18. Access mechanism 22 allows to select among the various records, and for each record among the tracks thereon. If applicable, both read and write on disc can be allowed, although the invention may in principle function with read-only. Player body 24 comprises various subsystems. First, block 28 controls the accessing by access mechanism 22. To this effect, external controls 26 such as user buttons or remote control have been provided. Further control and selection signals are produced by processing means 34. For simplicity, blocks 28, 30, 34 have been linked in a chain; it is understood that blocks 34 and 28 may interact immediately. The mechanical access facility is only one of many feasible embodiments as well.

Block 30 represents the audio processing; the audio output proper is symbolized by arrow 32, and the output is time-conformingly, so that the user experiences the resulting speech, music, etcetera as a natural phenomenon. Of course, fast-forward and other modes can be provided as well, both for standard output, and with respect to adaptation to the user's wishes. Moreover, in the case of a (video) game, the presentation need not follow a uniform temporal sequence; also still pictures could be presented. Parallel output of more than one presentation stream would be feasible as well, such as speech combined with background audio from an unconnected track from stack 20. Video and audio can be combined; animation from a game can be combined with audio of a kind preferred by the user.

Processing means 34 implement the dynamic behaviour of the items as agents. It may be based on conventional hardware, whereas the associated software will be discussed hereinafter. The software may be resident; the data that relate directly to the items may be received from the audio record, but also from an external facility such as Internet. If received from the discs, this is done by an initial scan from all discs of the stack before replay actually starts. Output of the selecting system is a sequence of control signals for access controller 28. If appropriate, certain control signals, or behaviour data of the items may be written on the actually accessed disc from stack 20. In particular, this can be done when entering a 'freezed' situation.

Figure 2:
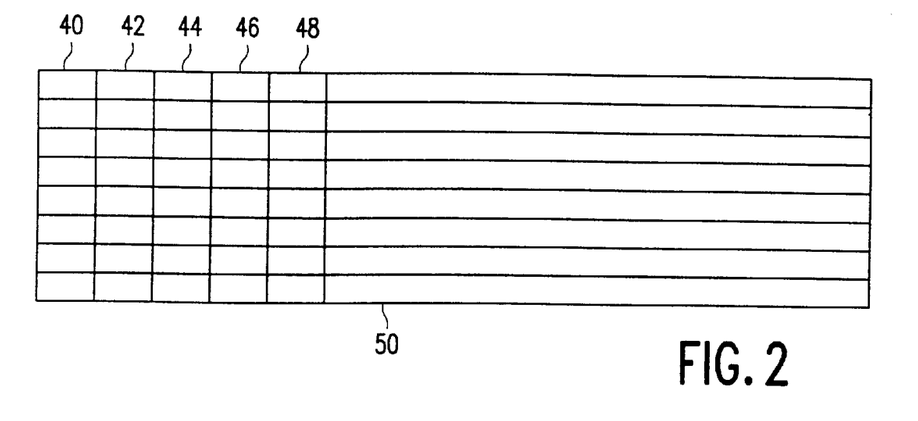
FIG. 2, an exemplary configuration of stored items.

FIG. 2 shows an exemplary configuration of stored items. In this limited example, each row relates to one item, or in the case of CD, a track. The main body 50 of the respective items contains the user information, that in a simple case may be a single song. In another environment, it may constitute a movie episode, a photograph, and beside user information for direct outputting, it may contain program data for controlling the user features, such as is feasible in a Compact-Disc Interactive environment. Furthermore, each item in column 40 has an identifier, such as a number, and if applicable, an alphanumerical name, such as the title of the disc. Each block 42–48 for the item allows storage of a static attribute information and a weight quantity for each attribute, which informations pertain to the content or other aspects of the item in question. For music, the attributes may be the title of the song, the composer, the band, the lead musician's name, a list and categorization of instruments, item length, recording date, beat, type or style of the music, and various others. For other types of item other attributes apply.

The weight informations will generally not be constant. Initially, the weights constitute seed data to enable subsequent behaviour of the item as an autonomous agent. Subsequently, these weights are updated under control of past presentation data and/or user control signals on symbolic input 26 in FIG. 1, and are retained in local memory of processing means 34. The behaviour of the items is governed collectively by behavioral and interactivity prescriptions, that can be metaphored as the 'equations of motion' of the items; these need not be uniform among the various items. If necessary, also the behaviour parameters would need the providing of seed data. In this way, each respective item constitutes an autonomous agent. This means that the behaviour of the items is also subject to external influences.

USAGE OF THE AGENT FEATURE

The agent feature of the present invention uses three sets of information that influence the behaviour of the items for presentation:

a. Each item has static attribute data, that each have a value and describe the properties of the item, such as were discussed in the preceding paragraph. Examples in the case of music are binary attributes (yes/no live recording), nominal attributes (music style), ordinal attributes (such as tempo, distinguished into slow-medium-fast), interval attributes (serial number), ratio attributes (number of musicians).

b. Second, each attribute value has a weight, that indicates the relevance of the attribute, as will be elucidated by the description of the behaviour principles hereinafter.

c. Third, each item has dynamic behaviour parameters that are privy to each item, and that represent instantaneous behaviour of each respective item agent, as influenced by the input quantities under #a and #b. In the metaphor used herein, these could express instantaneous position and speed of the item as being mapped on a particle, and the particular features to 'observe' or 'sense' another agent.

d. Finally, the whole set of agents is governed by behaviourial and interactivity prescriptions between the agents.

Now, the agents form the population of the database. The prime motivation for each agent would be to achieve a positive appreciation by a user person, which would define a success quantity for the item in question. A secondary motivation for an agent is to associate itself to another agent, with which it has something among the attributes in common. Now, in the discussion hereinafter, for a particular behaviour to occur, generally one or more other conditional behaviours of the agent itself or of other agents, are a prerequisite. The behaviour hereinafter is restricted to executing an action. A particular agent may be undertaking various different actions simultaneously. The following exemplary behaviours are listed:

SenseOther. An agent can sense another agent if the two are within a certain Euclidean distance or within the same sector of the database space. For reasons of visualization, the space is hereinafter mapped on a two-dimensional plane, in which the agents move with a non-uniform, and not necessarily steady speed.

ObserveOther. If an agent senses another agent, a similarity measure of the other's track to the track of the observing agent is calculated. The agent will follow under various conditions, that may comprise one or more of the following:

1) if the similarity exceeds a threshold it will follow;
2) the similarity determines a probability for following, which can occur if several agents are sensing each other simultaneously;
3) the threshold is determined from earlier observations;
4) the threshold is based on other agents in the cluster of the observed agent, thereby determining which one of the other agents should be followed.

FollowOther. If an agent decides to follow another agent, it assigns itself to the cluster of the agent followed, which may be either an existing cluster, or a new one. If an agent decides to stop following another agent, it removes itself from the cluster of the latter agent, which may lead to dissolving the cluster in that only isolated agents remain thereof.

ReObserveOther. If an agent is presently executing a FollowOther behaviour, and if within a certain time no new candidate for following is sensed, the above similarity measure is calculated again. Also the threshold may be updated, such as under influence of the number and/or behaviour of the other agents in the cluster. This may effectively lead to terminating of the action of following. This terminating can lead to new situations: either the old cluster persists with one item less, or the old cluster is dissolved in that it is reduced to a single item. The terminating item itself can become either a free item or agent, or may become the root agent of a cluster that is split of.

Figure 3:
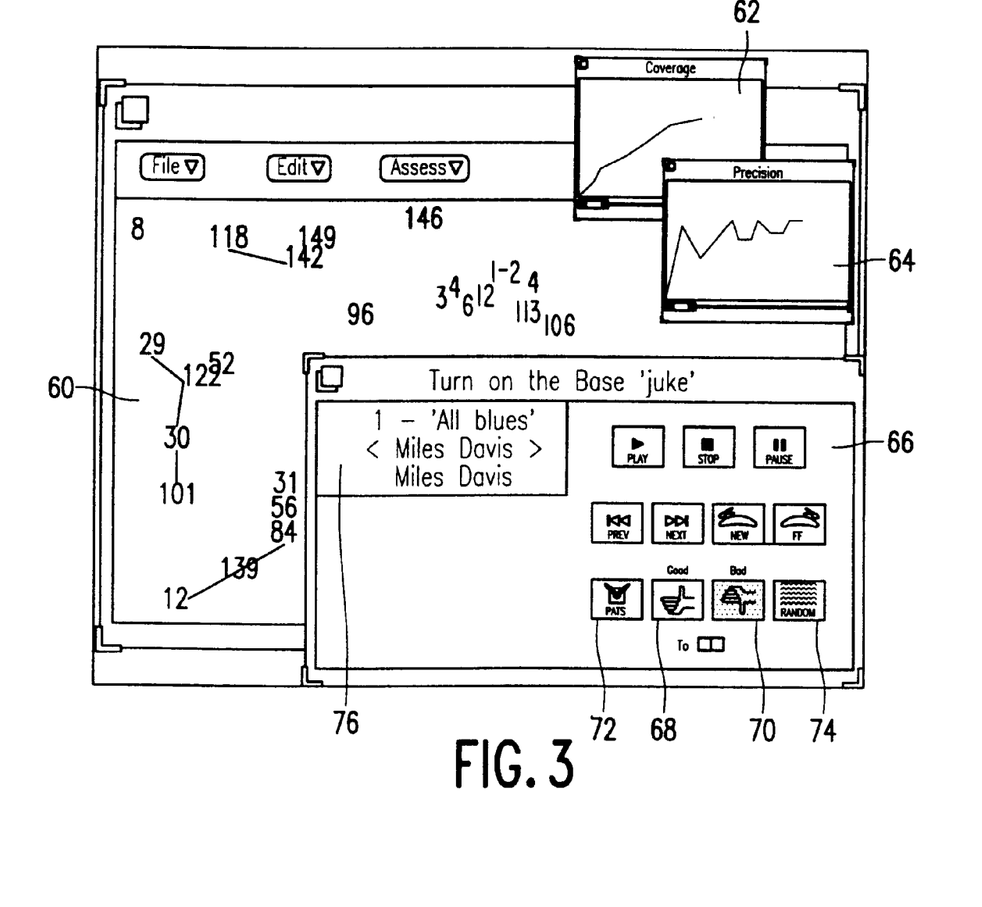
FIG. 3, a sample display of a graphical user interface.

In this respect, FIG. 3 gives a sample display of a graphical user interface for a prototype embodiment. The overall display features a WINDOWS organization, that is common general knowledge in computer art. Main window 60 shows a representation of the agents in two-dimensional space. Each agent is represented as a numbered dot. An action of following is indicated by a line drawn between the agent followed and the agent following. If the two are very close to each other, the interconnection becomes invisible. Clustering is a result of such following. All agents of a cluster are connected along branches of a tree that has a particular root item. Motion is shown by difference between successive images. The behaviour of the agents is determined by what the database offers to the user.

A few control buttons are deemed self-explanatory. Secondary windows 62 and 64 give metrics Coverage and Precision to be discussed hereinafter. Main control window 66 represents the user control interface for the system. First, field 76 shows the details of the item that is presently presented as audio, in this case being limited to song title, composer, and principal performer. Furthermore, seven control buttons are shown that are largely conventional, to wit play, stop, pause, previous, next, fast rewind and fast forward: these features are based on the instantaneous situations of the agents in the database, on which the control system has decided a sequence of presenting the items to the user person. The embodiment has four further control buttons. First, button 74 activates full random selection among the items in the database, according to the shuffle play feature discussed supra. Second, button 72 activates the system according to the present invention, wherein the sequence among the items presented is controlled on the basis of the agents. The third control mode is linearly along the list of items. Button 68 enters a positive evaluation of the item presently being reproduced, whereas button 70 enters a negative evaluation: these are used as inputs for the ID-3 policy to be discussed hereinafter.

SIMILARITY

Hereinafter, the determining of the similarity measure is discussed; the similarity has the nature of a descriptor. When track (item) i observes track j, it calculates a similarity measure defined as the weighted sum of the corresponding attribute-value similarities between the two tracks according to:

$$s_{ij} = \sum_{k=1}^{K} w_{ik} s_{ijk}, \text{ wherein } \sum_{k=1}^{K} w_{ik} = 1.$$

Herein, K is the total number of attributes, $s_{ijk}$ is the similarity between two tracks i,j for the listed attribute k, and $w_{ik}$ is the associated weight factor. Weight factors need not be commutative. The weights are adjusted during adapting to evaluation signals from a user. Note that the observing action need not be commutative either.

The calculation of the similarity s for attribute k is given by the data type of the object class to which k belongs. The similarity of attributes representing binary, nominal, ordinal, or interval data types is 1 at identity, and 0 otherwise. The similarity of set-oriented attributes is determined by the weighted number of matching attributes. For rational attributes, the similarity is $$s_{ijk} = 1 - \{R_k^{-1} * |v_{ik} - v_{jk}|\},$$

wherein $v_{ik}$ are the values for the two tracks for attribute k and $R_k$ is the maximum rank difference or total span for that attribute.

By itself, musical preference to attribute value pairs is mapped by means of the ID3 procedure, that has been described in J. R. Quinlan, Induction of Decision Trees, Machine Learning 1, p.81–106, 1986. This procedure shows which attributes are most accurate in distinguishing preferred from non-preferred musical tracks. A so-called parent set of tracks is during a training session labelled by the user as preferred or non-preferred. Next, this parent set is partitioned into disjoint subsets until all subsets consist of tracks that either are all labelled preferred, or all are labelled non-preferred. This partitioning is recursively directed along attributes. At each recursion, a so-called best attribute is chosen. In the embodiment, this was the attribute that gave the highest entropy reduction (highest information gain) for the partitioning. This entropy measure expresses how well the associated attribute distributes the parent set along its values into uniformly labelled subsets. The entropy is defined as:

$$E(S) = -(p/N)*\log(p/N) - \{(N-p)/N\}*\log\{(N-p)/N\}$$

Herein, the parent set S contains N tracks, of which p are labelled preferred. The entropy is maximum at 1 if exactly half of the tracks are 'preferred'. The information gain with respect to a parent set S and attribute A with the resulting disjoint subsets $S_i$, wherein i=1. . . I is defined as:

$$\text{Gain}(S, A) = E(S) - \left\{\sum_{i=1}^{I} \{|S_i|/|S|\} * E(S_i)\right\}$$

Herein, |S| is the number of elements in S. In the resulting tree, each path from the root to a leaf specifies the order wherein each successive attribute divides the parent set into a uniformly labelled subset. After generation of the tree, the weight factors of the track attributes are adjusted by passing each track of the listening session along the tree, while taking the appropriate branch for each attribute value. The weight factor associated with each attribute is multiplied by a constant, if the track is labelled as 'preferred', and divided by a constant otherwise.

For monitoring the performance of the system, herein the exemplary quantities performance and coverage are considered, cf. FIG. 3, small insert windows 62, 64. For better explanation, reference is had to FIG. 10. This figure presumes a large collection of items, denoted as Ω, is at one's disposal. The subset relevant to one's preference is denoted as the yet unknown set P. Consider a sequence of programmes presented successively in time starting at time t=1. Participants indicate preferred and rejected items in each programme. Now, a programme presented at some time t=T, denoted as C(T), will have a subset of preferred items, denoted as $C_p(T)$, which falls within the region of P.

Figure 10:
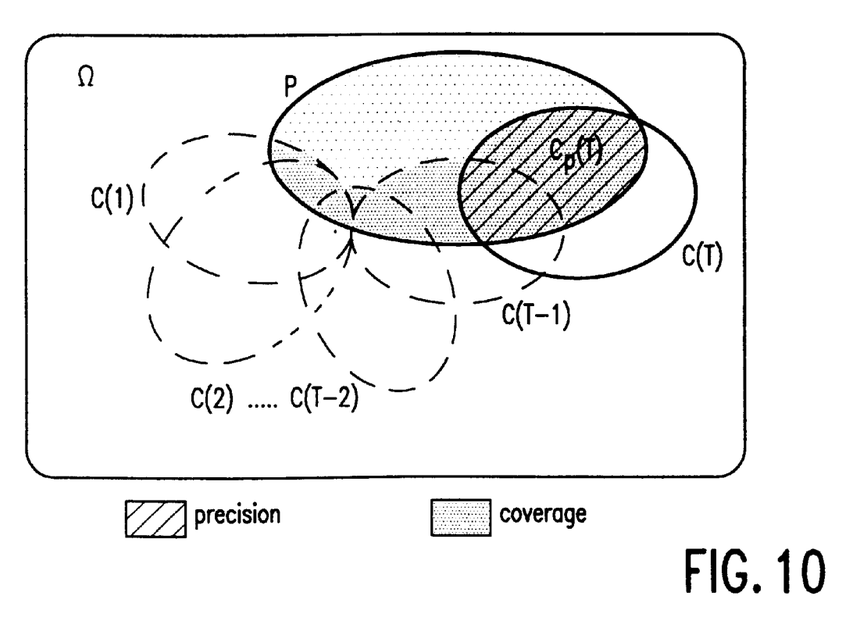
FIG. 10, an illustration of the parameters Coverage and Precision.

Precision measures the fraction of preferred items in a programme presented at time t=T, $$\text{precision}(T) = \frac{\#C_p(T))}{\#(C(T))}$$

where the operator #(C) denotes the number of elements in a programme C.

Coverage indicates how many different preferred tracks are selected over all programmes, and hence indicates the variety between programmes that can be attained within P.

$$\text{coverage}(T) = \frac{\#\left(\bigcup_{t=1}^{T} C_p(t)\right)}{\#(P)}$$

Over time, the coverage measure is a non-decreasing curve and ideally approaches 1, meaning that a nearly complete coverage of P has occurred. Its definition however requires a priori knowledge of the set P, which is rather imaginary with user tests in contrast with simulations. For this reason, the normalizing denominator in the latter Equation has been left out. In spite of the absence of this normalization, one is still able to explain phenomena by the course and trend of the coverage curve. Note that upon presentation of a new CD disc, its seed data must be downloaded; likewise, upon physically removing a disc from the system, the data associated thereto are deleted. Therefore, the precision does not inform us about alternative sets of preferred tracks that could have been selected. A particular strategy is to offer to the user not only a large proportion of the preferred tracks, but also a wide variety among the tracks labelled as preferred. In this way, all favourite material in the music collection can be evenly spread over successive listening sessions. The above coverage metric closely resembles the recall metric used in information retrieval theory.

Figure 4:
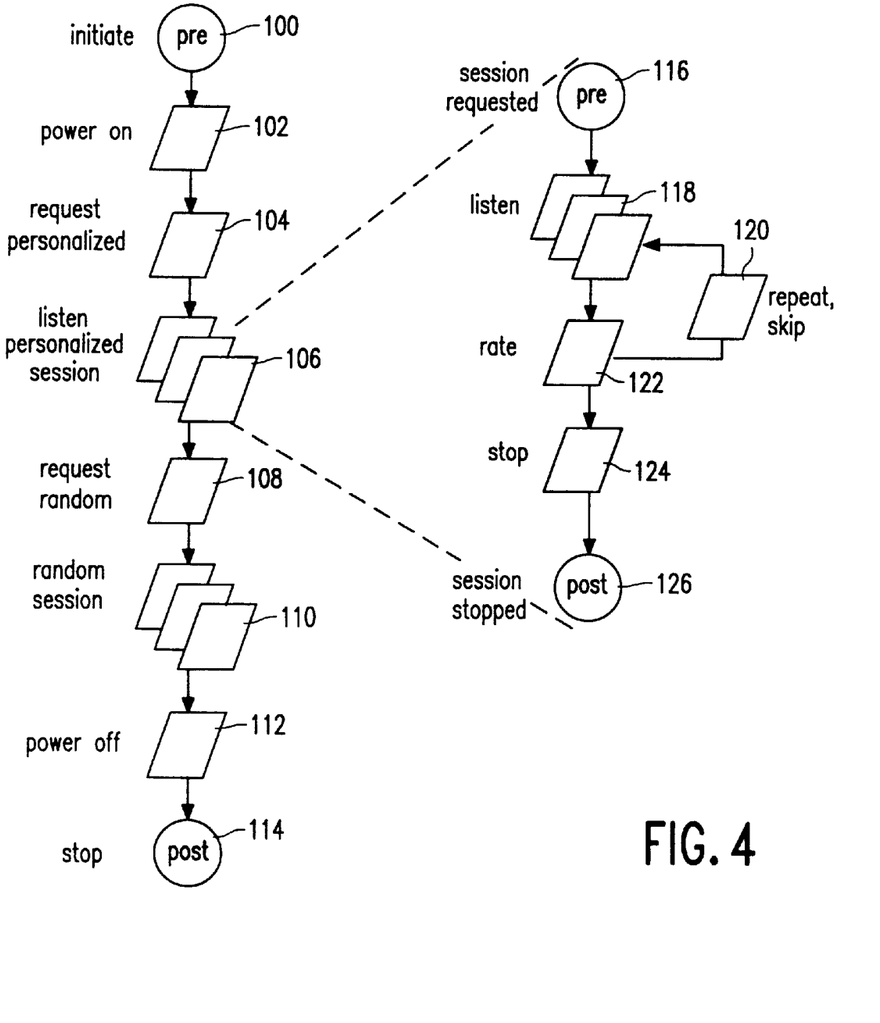
FIG. 4, a typical listening scenario of a system.

FIG. 4 gives a typical listening scenario of a system according to the invention. In block 100, the system is initialized, the control software loaded, as well as the items that can be presented to a prospective user. All this may have been done long ago. Moreover, the presentation system according to the invention can be initialized for subsequent activation. This can be done through defining one ore more prototypical users that would have respective different behaviour and/or clustering patterns among the items. Another manner of providing seed-informations for the system can be by providing a uniform distribution in space and more or less random dynamic values for the behaviour parameters.

In block 102 the power-on switch is activated. In block 104 the user person enters a request for a personalized listening session. In block 106 successive items are presented to the user in question, as shown more in detail at right. In block 116 the request is entered. In block 118, the successive items or tracks are effectively presented. In block 122, the user person enters a rating or evaluating quantity to the item just presented. As discussed earlier, an elementary rating system is good versus bad, but others are feasible. In block 120 standard user commands for "repeat" or "skip" track are symbolized. In block 124 the user requests to stop the sequence. In block 126 the sequence is effectively stopped, and the system reverts to its main selection menu, or another less specific situation. This terminates the listening session according to the terminology of the present invention. Thereupon, this may terminate or freeze the interaction between the various tracks, until a new listening session according to the invention is initiated. Alternatively, the interaction just proceeds. In block 108 the user may request a random presentation sequence or another known sequence. In block 110 various items are presented to the sequence now chosen. In block 112 the power switch is interrupted. In block 114, the session is stopped.

Figure 5:
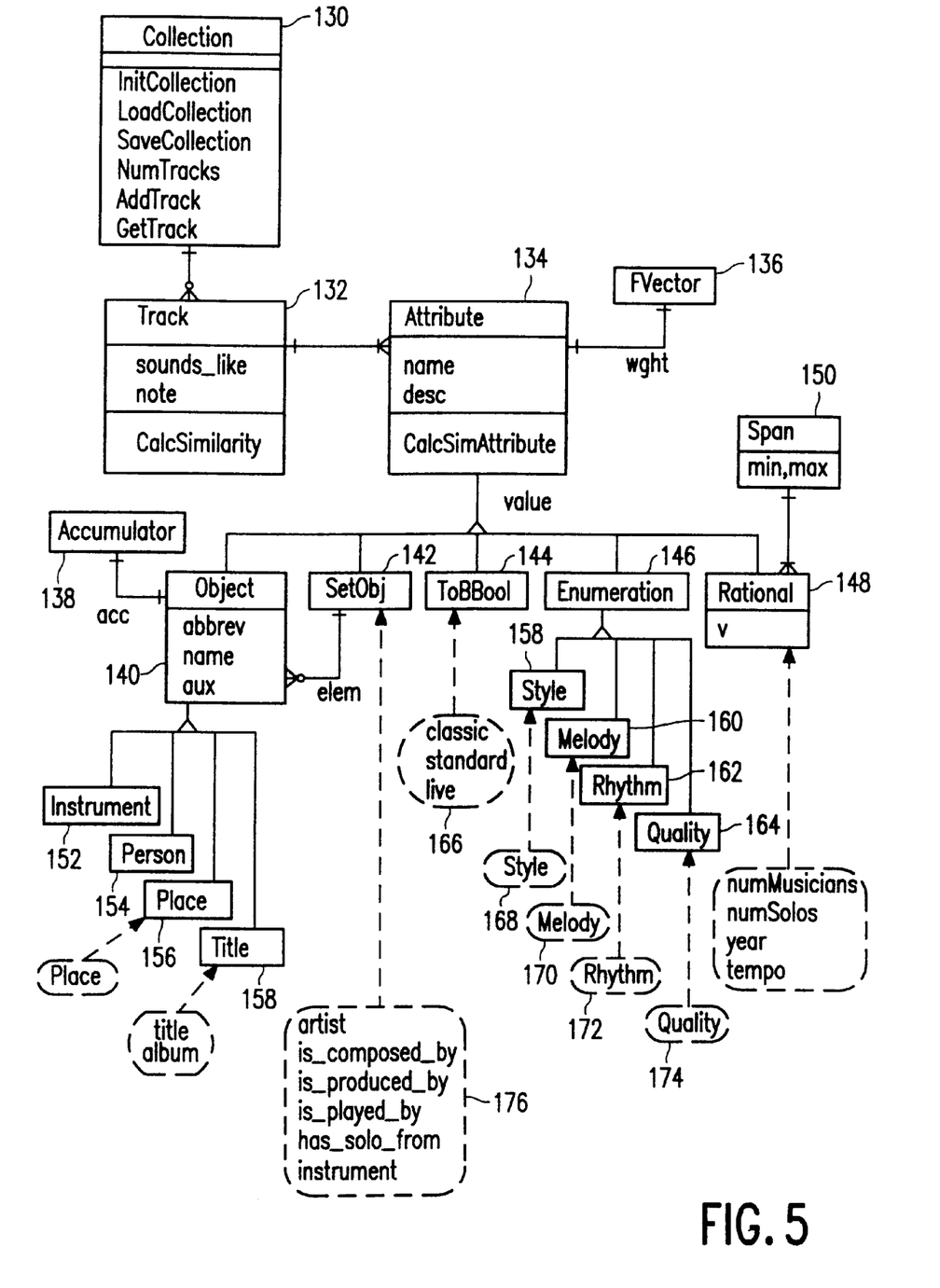
FIG. 5, a detailed object diagram of a set of items.

FIG. 5 is a detailed object diagram of a set of items. Block 130 symbolizes the complete collection of tracks, that has included the following standard database type features: initialize, load, save, number the tracks, add one track, get one track. Other features may be added. Block 132 symbolizes a single track, and its attributes and calculation of similarity with another track. It comprises a complete tabular description from which an excerpt is available. The item sounds-like is the name of a characteristic excerpt, the item note allows for free-format entering of extra information for later representation.

Block 134 for one particular track represents its superclass of all domain-type attributes that each have a name and a domain-type description. For a single attribute the block allows the calculation of similarity with a corresponding attribute of another track. Block 136 represents for each instance a float vector class that contains the weight factors for all attributes for similarity calculations. As shown in the lower part of the Figure, this Attribute class is further specialized into more domain-specific Attribute classes. Accumulator block 138 maintains the number of occurrences of a particular object, such as a person or a particular musical instrument, in the database.

Block 140 represents 'hard' attributes such as represented by blocks 152–156; certain of these attributes may have a hierarchical structure, such as a particular theatre in a particular city. Such contents have been indicated by interrupted lines. Block 142 represents a set of such objects. Block 144 represents binary attributes such as indicated in block 166. Block 146 represents nominal attributes, such as indicated in blocks 158–164, 168–174. Block 148 represents rational attributes such as indicated. Each rational attribute has an instance variable 'v' and corresponding span 150 that gives minimum and maximum values for the similarity calculation.

Figure 6:
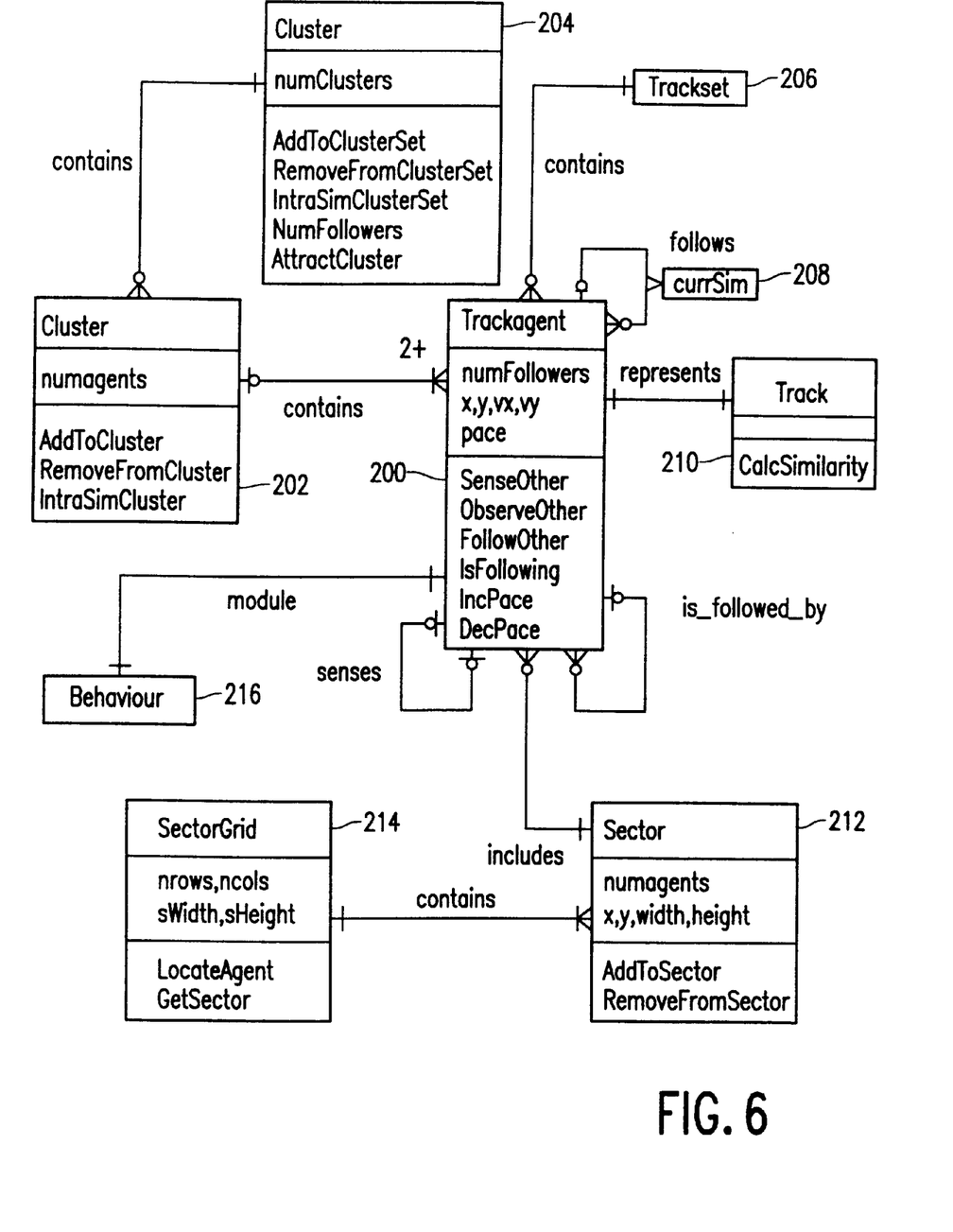
FIG. 6, a detailed object diagram of item behaviour.

FIG. 6 gives a detailed object diagram of item behaviour or population dynamics. The central element is the track agent 200, each one representing a single track. A track can have three different types of behaviour: 1) a free track does not form part of a cluster, and is not part of a follow behaviour; 2) a follower follows another track, and may be followed by a still further track; together they belong to one cluster; 3) a leader is followed by at least one other track of the same cluster. Furthermore, a track has various instance variables, to wit position x,y and velocity vx,vy in a space that for the embodiment has been taken two-dimensionally, and further variables pace and curSim. Pace is a velocity range between 1 and 6 describing the effect of disliking or dissimilarity with another track. CurrSim is the current similarity quantity $f_v(s_{ij})=s_{ij}^{Vmax-vi+1}$ on which the follow behaviour is based. Herein, $v_i$ is the current pace of the track, and $s_{ij}$ has been defined elsewhere. The lowest part of block 202 shows functions of a track that are self-explanatory. Block 206 represents all tracks that are contained in the set of objects. Block 202 represents a cluster that contains a selection of the items, has as variable its number of tracks, and functions that may change its number of tracks and their internal similarity. Block 210 represents a particular track and may calculate a similarity quantity with another track. Block 212 represents a sector of the two-dimensional space wherein the tracks move, and block 214 the regular sector grid on which the sectors are defined. The sectors are used to discriminate the distance between various tracks: only when in the same sector they may start to sense each other. On the other hand, following behaviour may cross a border between two sectors. The representation of the interconnections between the various blocks in this and subsequent Figures will be discussed with reference to FIG. 9.

Figure 7:
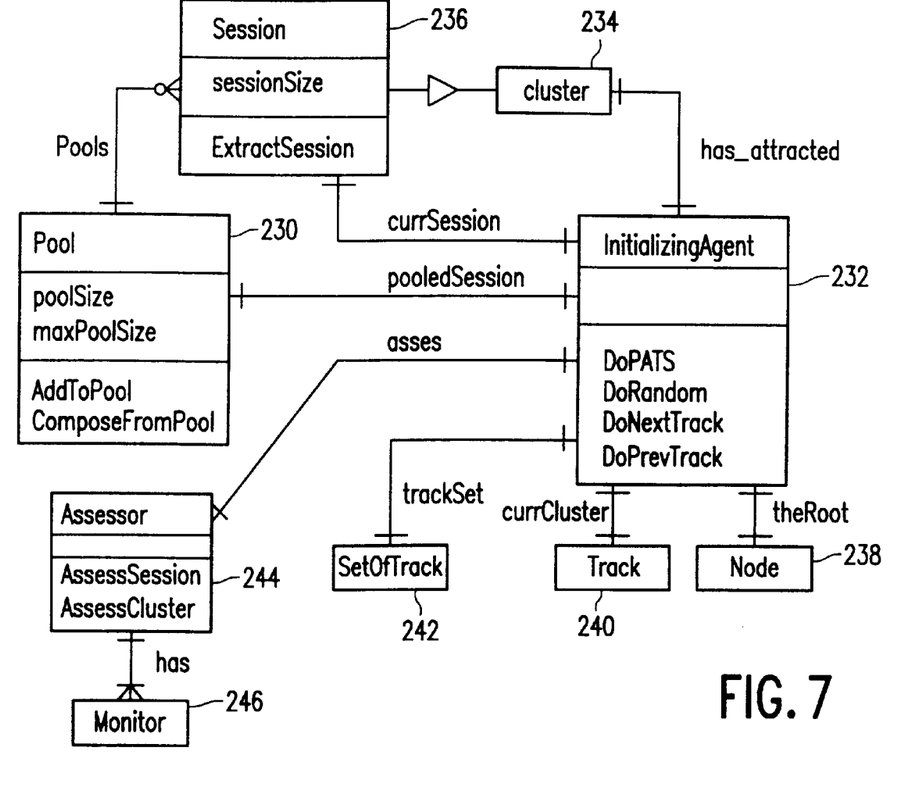
FIG. 7, a detailed object diagram of item interaction.

FIG. 7 gives a detailed object diagram of interaction between track items and a human user person. Block 232 represents an interaction agent or algorithm, that may control any of the four listed operation modes. The present invention is active in the mode DoPATS, that itself may be distinguished in a start and a stop facility. Pool 230 is a container with FIFO functionality for keeping the results of the latest listening sessions; its maximum size may be determined as a listening duration, a number of discrete sessions, a number of tracks activated, or a combination thereof. A Session 236 is a compilation of tracks as presented to a user. It is a specialization of the class Cluster described earlier. The size is upper-bounded, and the extract presented from Cluster is determined by inter-track similarity. The Cluster 234 is the total number of tracks that can be selected. Assessor 244 keeps track of the performance of the inventive functionality and the unfolding of the emerging clusters by calculating various measures such as precision, coverage, average intracluster similarity, and dynamic state. The latter quantities were discussed supra. Monitor 246 and the set of all tracks 242 are part of a user interface. Track 240 is the one being currently presented to the user. Node 238 describes the actual node.

Figure 8:
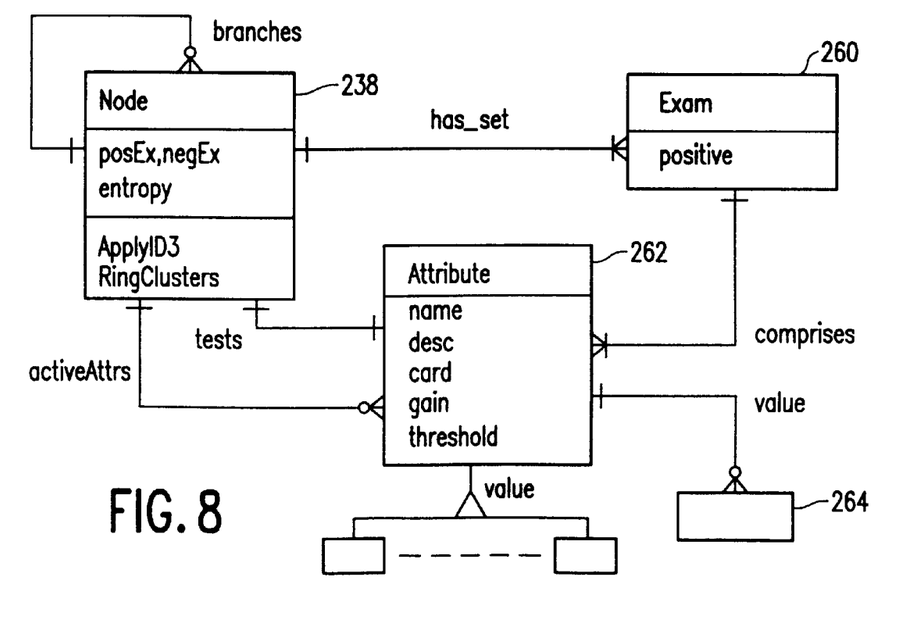
FIG. 8, a detailed object diagram of bookkeeping.

FIG. 8 is a detailed object diagram of the so-called ID3 bookkeeping referred earlier. This method builds a decision tree top-down by measuring at each interior node which attribute is currently the best classifier. The following object classes are identified: Node 238 (cf. FIG. 70) does the bookkeeping at a tree level necessary for the ID3 procedure. The tree is made up from instances of Node. The set of example tracks classified up to this node is maintained by the association has_set. The association tests refers to the attribute that is chosen as best classifier for this node. The set of attributes that have not yet been tested along the path from the root to this node is held by the association activeAttrs. Each attribute can only be chosen once as best attribute. Block 260 contains the numbers of positively and negatively labelled tracks. The association comprises maintains the attributes originating from the corresponding track. This class replaces the class Track, because not all attributes and their values need to be considered relevant for the ID3 procedure.

Figure 9:
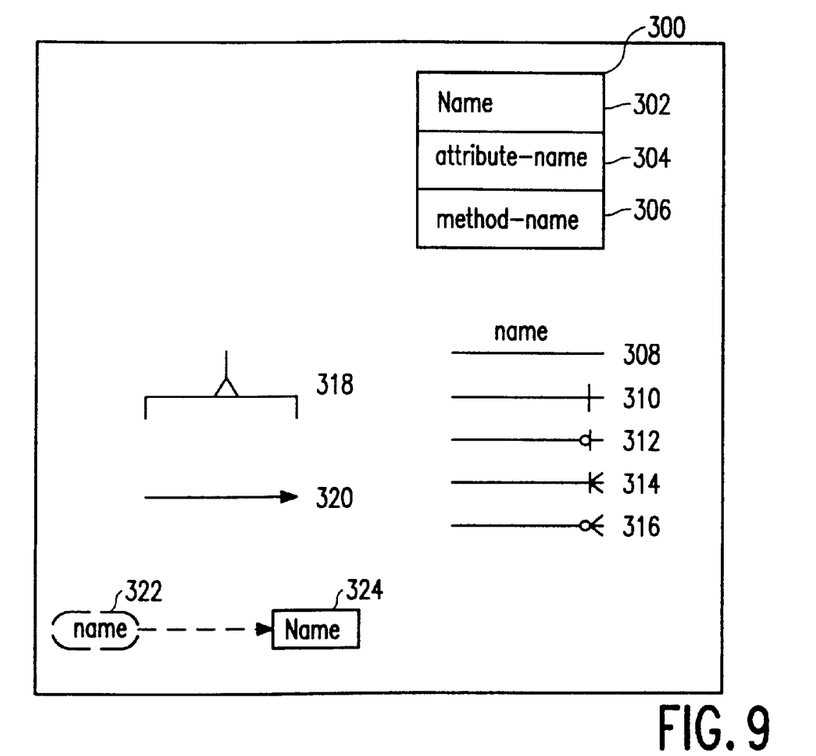
FIG. 9, graphical symbols used in an object diagram.

FIG. 9 shows graphical symbols used in the object diagrams of FIGS. 6–8. Therein, composite block 300 symbolizes an object that has a name (302), and some optional attributes with a name (304), and some optional methods with a name (306). Entry 308 represents a named association. Entry 310 represents a multiplicity (1,1). Entry 312 represents a multiplicity (0,1). Entry 314 represents a one-to-many multiplicity. Entry 316 represents a zero-to-many multiplicity. Entry 318 represents an is_a_relation or inheritance condition. Arrow 320 denotes a producer-to-consumer data flow. The last entry represents an instance creation, wherein object name (322) is of class Name (324).

We claim:

1. A user-adaptive audio and/or video presentation system containing a background presentation sub-system for presenting audio and/or video items, control means for controlling said presentation sub-system as regarding an automatically generated selection sequence amongst said items according to a user preference pattern, and output means for physically presenting selected items to a user, wherein each said item has a uniformly structured first set of static attribute data and associated second set of weight value data indicating relevance of the static attribute data, and also a third set of dynamic behaviour parameter data, and said items are with respect to their dynamic behaviour collectively governed by a set of behavioral and interactivity prescriptions, so that each respective item represents a respective autonomous agent, and said control means include processing means for under influence of said first and second sets of data and as governed by said prescriptions, updating said weights and dynamic behaviour parameter data of each item in question vis a vis other said items for subsequently influencing said controlling.

2. A system as claimed in claim 1, wherein said behaviour is metaphored as motion within a finite space of at least two dimensions.

3. A system as claimed in claim 1, and being arranged for forming among said items one or more temporary association clusters which forming is conditional to similar behaviour amongst the respective item agents in such cluster, and said presentation favours an item pertaining to a most recently accessed said cluster.

4. A system as claimed in claim 3, wherein associating to a cluster is subject to arising of a sense_item situation, followed by detected similarity in an observe_item situation.

5. A system as claimed in claim 1, wherein said updating is enabled for a particular said item independent of actual scheduling for presentation thereof.

6. A system as claimed in claim 1, and having user evaluation input means for selectively influencing said updating at least with respect to said weight value data for a particular item through an evaluatory physical input.

7. A system as claimed in claim 6, wherein said particular item is the item presented most recently.

8. A system as claimed in claim 6, wherein said influencing and updating is effective on a whole-cluster basis.

9. A system as claimed in claim 1, and having freeze means for blocking autonomy of said agents, and thus freezing said behaviour as dictated by said autonomy.

10. A system as claimed in claim 1, for use in a multimedia environment.

11. A system as claimed in claim 1, and allowing simultaneous access at a plurality of user stations.

12. A system as claimed in claim 1, wherein said presentation sub-system is a storage system for storing and accessing audio items which are distributed amongst a plurality of physical media instances that each allow collective storage of a plurality of such items.

13. A system as claimed in claim 1, wherein said presentation system is a storage system with write feasibility for accommodating storage of said dynamic parameter data or other calculated data after formation of the latter.

14. A method for user-adaptive audio and/or video presentation comprising the steps of:

selectively accessing a background presentation sub-system for presenting audio and/or video items according to a user preference pattern, and physically outputting selected items to a user, wherein operating each such item as an autonomous agent on the basis of a uniformly structured first set of static attribute data and associated second set of weight value data indicating relevance of static attribute data, and also a third set of dynamic behaviour parameter data associated to the item, and furthermore through behavioral and interactivity prescriptions for governing their collective dynamic behaviour, and by under influence of said first and second sets of data and as governed by said prescriptions, updating said weights and dynamic behaviour parameter data of each item in question vis à vis other said items for subsequently influencing said controlling.

\* \* \* \* \*